United States Patent [19]

Teichman

[11] Patent Number: 5,186,259
[45] Date of Patent: Feb. 16, 1993

[54] HORSESHOE HAVING A DEPRESSION ON THE INSIDE OF HOOF FACING SIDE

[76] Inventor: Stephen T. Teichman, #4 Forrest Hills, Downingtown, Pa. 19335

[21] Appl. No.: 793,530

[22] Filed: Nov. 18, 1991

[51] Int. Cl.⁵ ............................................. A01L 1/02
[52] U.S. Cl. ..................................................... 168/24
[58] Field of Search ................. 168/4, 24, DIG. 1, 2, 168/11

[56] References Cited

U.S. PATENT DOCUMENTS

| | | | |
|---|---|---|---|
| 147,371 | 2/1874 | Carruthers et al. | 168/24 |
| 252,210 | 1/1882 | Goodenough | 168/24 |
| 283,849 | 8/1883 | Billings | 168/24 |
| 329,451 | 11/1885 | Hamaker et al. | 168/24 |
| 496,760 | 5/1893 | Tracy | 168/24 |
| 570,278 | 10/1896 | Dellinger | 168/24 |
| 1,148,886 | 8/1915 | Bird | 168/24 |
| 3,310,115 | 3/1967 | Ward | 168/DIG. 1 |

OTHER PUBLICATIONS

Webster's New Twentieth Century Dictionary of the English Language Unabridged 2nd ed. The World Publishing Co. (1964).

Primary Examiner—Robert P. Swiatek
Assistant Examiner—Todd E. Manahan
Attorney, Agent, or Firm—Patricia A. Schreck

[57] ABSTRACT

There is provided by this invention a horseshoe for attachment to a horse's hoof wall. The horseshoe is a generally U-shaped article made of substantially solid material and having a toe section and a pair of arcuate branches with heel areas at the ends thereof, the article having a hoof wall facing side, a ground facing, substantially planar side and a plurality of nail apertures therein for attaching the article to the wall. The top wall facing side has a depression substantially along the entire inside of the shoe and extends inwardly to about half the width of the web.

11 Claims, 3 Drawing Sheets

HORSESHOE HAVING A DEPRESSION ON THE INSIDE OF HOOF FACING SIDE

FIELD OF THE INVENTION

This invention relates to the field of horseshoes designed to, inter alia, reduce pressure by the shore on the sole of the hoof and allows for proper expansion of the hoof by the unique angle and placement of holes within the shoe. More particularly, the invention relates to a "split level" horseshoe for attachment to a horse's hoof which comprises a top sole facing side having a depression substantially along the entire inside of the shoe, which depression extends inwardly and substantially parallel to the ground surface of the shoe to about the center of the web of the shoe.

BACKGROUND OF THE INVENTION

Horseshoes come in a variety of size and shapes depending upon the type of horse and the work for which the horse is to be used. Generally, horseshoes are U-shaped and conform to the circumference of the hoof with two branches emanating from the toe area and projecting beyond the heel. The shoes are preferably as light as the activity anticipated and are affixed to the hoof with as few nails as possible.

In the formation of the shoe from a material such as steel, the inside edge of the shoe has a tendency to swell to compensate for the reduced area. This swelling, if not removed can cause excess pressure on the inside of the white line of the horses hoof and cause soreness as well as other problems. To combat this, the inside edge of shoes of the prior art have been leveled on their sole facing side. In addition, some shoes of the prior art have the inside edge of the sole facing side beveled slightly so as to cause a small air gap between the inside edge of the sole facing side of the shoe and the sole when the shoe is place flush on the hoof. Further, this was done to reduce the error due to poor fitting shoes and to place more of the horses weight on the outside edge of the shoe. This slight beveling is known in the trade as "concave". However, such concave shoes are applied to a static horse. When the horse is in motion, the gap tends not to be adequate for most horses, particularly sport horses, because the solar surface descends during motion to a greater extent than has been accommodated by prior art shoes. Thus shoes of the prior art can bruise and injure the sole, interfering with work and enjoyment of the horse.

Traditionally, nail placement has extended from the toe area to beyond the widest part of the quarters. Such nail placement can interfere with normal hoof expansion of the working sport horse. Additionally, prior art shoes generally do not give the farrier choice of pitch through which to place the nail. Nail apertures traditionally descend vertically through the shoe at ninety degrees. Accurate nail placement is a further aspect of a horseshoe which can aid or hinder in the overall performance of the sport horse. Nail placement is critical to the shape of the natural hoof capsule. That is, the normal hoof requires steeper pitch in the toe than the heel.

Accordingly, there remains a need for a horseshoe designed for the particular needs of the working horse. Such a shoe would be light in weight, a factor important to the horse's movement, speed, soundness and maximum performance without sacrificing durability. Additionally, such a shoe would substantially reduce pressure on the sole of the hoof in motion as well as providing a design of nail apertures which gives the farrier greater latitude in nail placement to accommodate the needs of the toe and heel and particular hoof idiosyncrasies.

SUMMARY OF THE INVENTION

There is provided by this invention a novel horseshoe for attachment to a horse's hoof wall. The horseshoe is a generally U-shaped article made of substantially solid material and having a toe section and a pair of arcuate branches with heel areas at the ends thereof, said article having a hoof wall facing side, a ground facing, substantially planar side and a plurality of nail apertures therein for attaching said article to said wall. The top wall facing side has a depression substantially along the entire inside of the shoe and extends inwardly to about half the width of the web.

The horseshoe of this invention surprisingly produces an exceptionally light yet strong shoe. Among other favorable characteristics, the shoe of the invention has the tendency to resist bending or spring which is a common problem with similar shoes. Further, the depression permits substantial solar flexing before contact of the sole with the depressed area, thereby reducing a number of soundness problems that result with shoes of the prior art.

In another embodiment of the invention, the novel horseshoe further has nail apertures which define an outside edge extending downwardly through the horse shoe at an angle in the range from about 80 degrees to about 70 degrees. Due to the unique design of the holes, this allows the farrier optimal nailing which is essential in proper shoeing.

In yet another aspect of the invention, the horseshoe further includes a plurality of holes are placed substantially as shown in FIGURE 1.

DETAILED DESCRIPTION OF THE INVENTION

Figure 1:
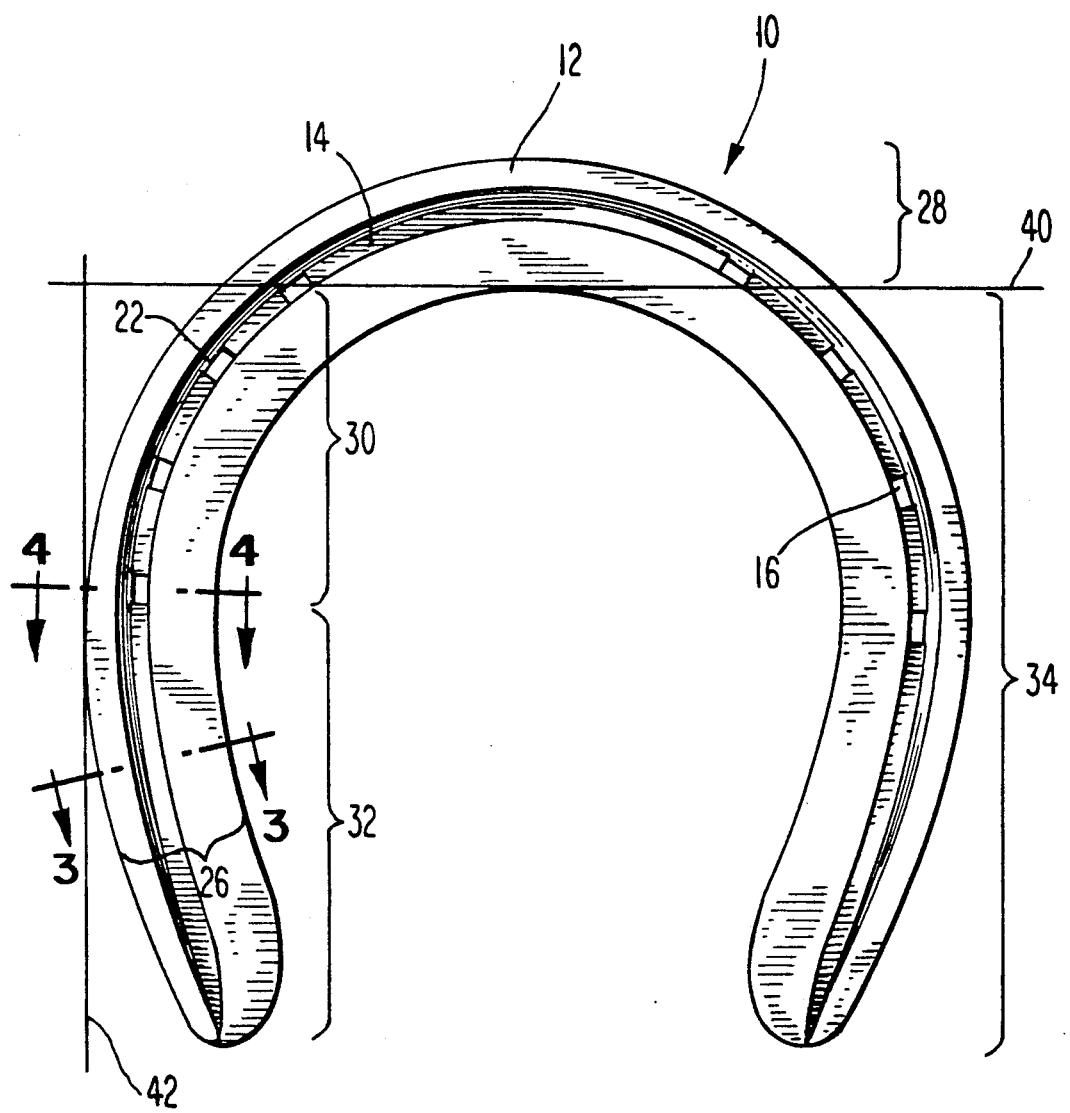
FIG. 1 is a plan view of the ground side of one embodiment of the horseshoe of this invention.

In one aspect of this invention, there is provided a horseshoe for attachment to a horse's foot wall. As can be seen from FIGS. 1 and 2, the horseshoe 10 is a generally U-shaped article made of substantially solid material. The material is preferably steel for sport horses due to the obvious punishment the shoe is to undergo. However, the shoe 10 could be made of other materials such as aluminum, plastic or fashioned as a composite. As shown in FIG. 1, the shoe 10 further has a toe section 28 and a pair of arcuate branches 34. The branches 34 extend from the toe section 28 by a section referred to as the quarter section 30 which extends to heel areas 32 at the ends thereof. The shoe 10 has a ground facing, substantially planar side 12 and a top hoof wall or sole facing side 18 with a plurality of nail apertures 16 therein for attaching the shoe 10 to the wall of the hoof.

Figure 2:
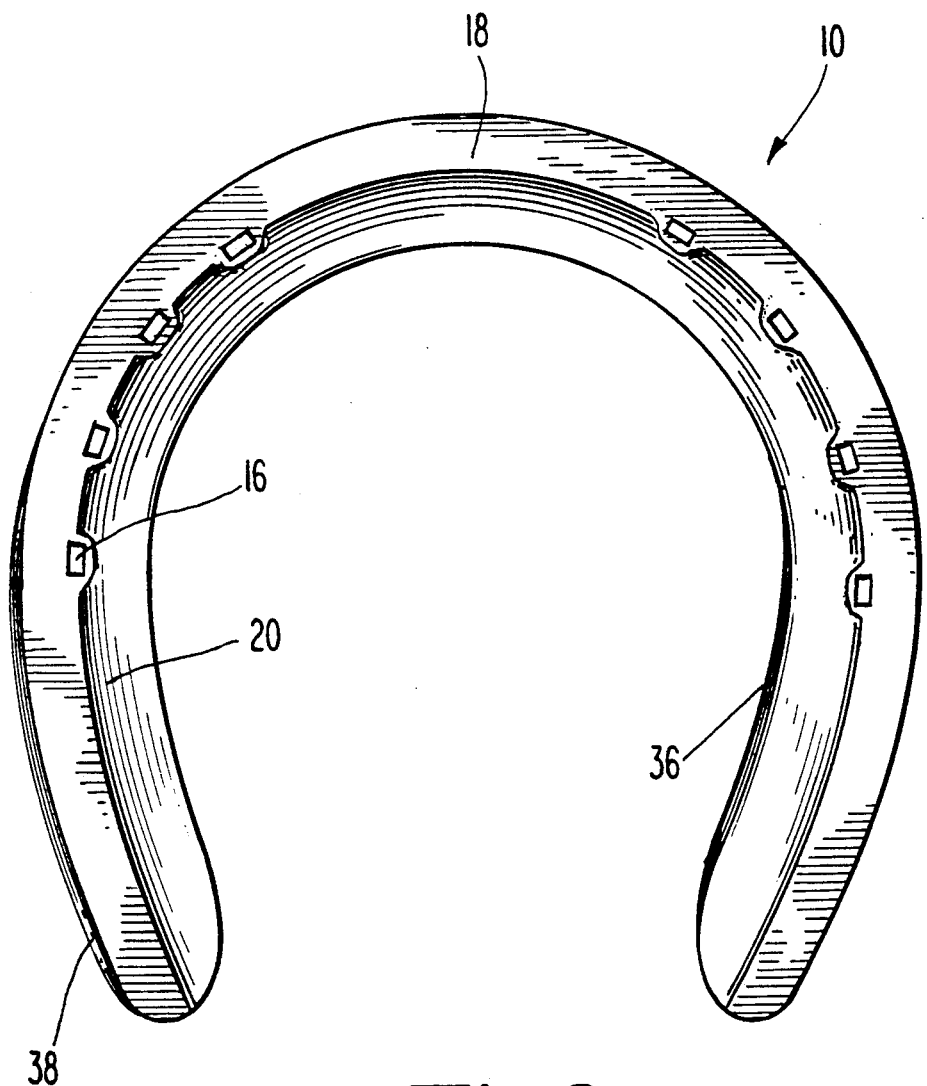
FIG. 2 is a plan view of the hoof sole side of one embodiment of the horseshoe of this invention.
Figure 3:
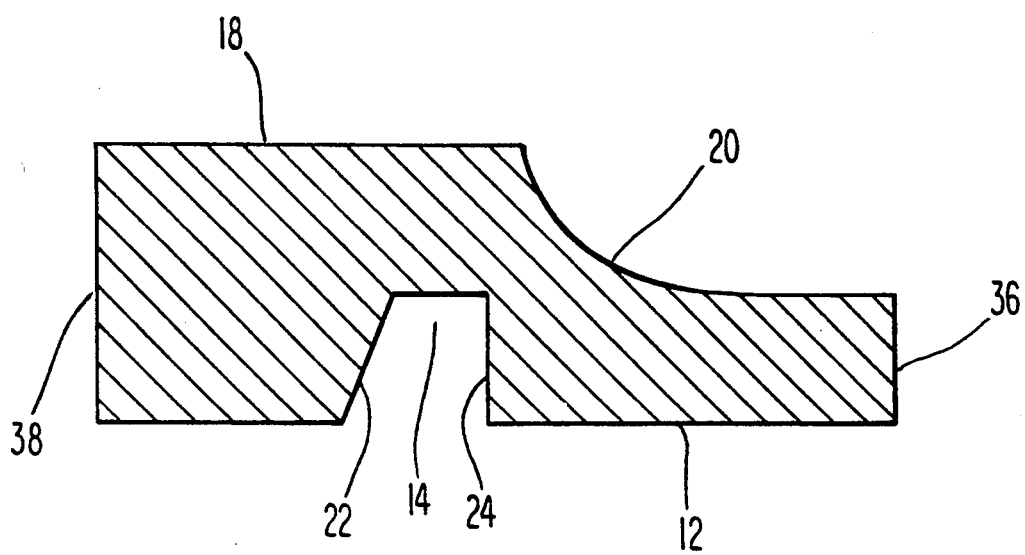
FIG. 3 is a cross-sectional view taken along lines 3—3 of FIG. 1.
Figure 4:
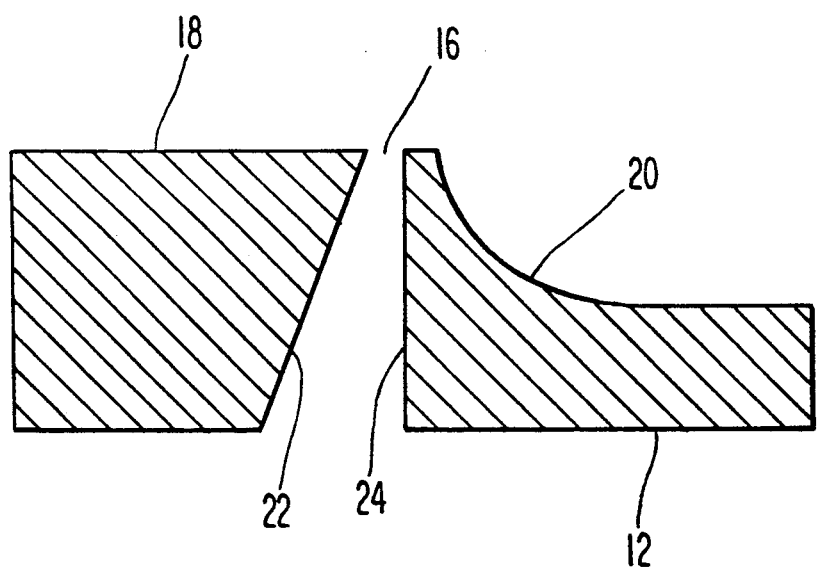
FIG. 4 is a cross-sectional view taken along lines 4—4 of FIG. 1.

As shown in the embodiment of FIG. 2, the top wall facing side 18 has a depression 20 substantially along the entire inside of the shoe 10, that is, from one heel to the other heel. This depression gives the shoe a "split level" appearance. The depression in the shoe of the invention extends inwardly to about a line defined by the center line of the nail apertures, i.e., the depression extends in about fifty percent of the width of the web, and is substantially along the entire inside of the shoe. "Web" 26 as used herein refers to the common usage of the term in the trade which is the width of the shoe which is generally the same throughout the shoe except of course the heel area which can be narrower. Thus, "depression" as referred to herein, means a relatively wide, at least about half the width of the web 26 and extending substantially the whole inside length of the shoe and the depression results in a decreased height of the inside edge 36 of the shoe as compared to the outside edge height 36 to reduce sole pressure of the horse in motion. The depression is preferably such that the inside height of the shoe is at least about twenty percent of the outside edge height 30 of the horseshoe to about eighty percent. The choice of depression depth will depend on a number of factors. One skilled in the art will be able to determine what depth the particular horse being shod will require. Generally, an inside edge height 36 of about forty percent of the outside edge height 38 to about sixty percent will be satisfactory for most horses, with fifty percent being most convenient as it is expected to be suitable for the majority of horses.

The depression 20 preferably extends inwardly to a line defined by about the center of the nail apertures 16 in a manner substantially parallel to the ground facing side of the shoe 12 and terminates sharply in an upwardly arcing manner as shown in FIG. 2. Depending on how the shoes are to be manufactures, the depression could be generally of an "L" shape. It is preferred the depression extend inwardly in an arcing manner such as a "J" at a 90 degree angle rather than an "L" shape so that dirt is not readily trapped in the sharp angle of an "L" shape. The important aspect of the depression is that the actual lowered portion of the depression, i.e., the portion extending inwardly in a manner substantially parallel to the ground side 12, encompasses at least two-thirds the width of half the web width. This factor is believed important in providing the maximum area in which the shoe is not contacting the sole yet still maintaining a durable shoe.

The horseshoe of the invention will conveniently be formed from one piece of material. However, it is within the scope of this invention that calks, toe clips and other various accessories known to those in the art can be incorporated into the shoe of this invention.

In another aspect of this invention, the horseshoe further provides nail apertures 16, as shown in FIGS. 1 and 2, defining an outside edge 22 and inside edge 24 extending downwardly through the horse shoe at an angle in the range from about 80 degrees to about 70 degrees, preferably, for most sport horses the angle of the nail apertures 16 will be 75 degrees. What is meant by outside edge 22 as used herein refers to the portion of the nail aperture 16 closest to the outside edge of the shoe. If there is a fuller or swedge 14, the outside edge of the groove 22 formed by the fuller or swedge 14 is conveniently of the same angle as the outside edge of the nail aperture. The nail apertures 16 are such that they are the shape and size to accommodate nails that are customarily used for the type of horse and shoe. Thus, the farrier has an option in angle through which to place the nail as opposed to standard verticle holes.

Further, as can be seen in FIGS. 1 and 2, the horseshoe of the invention has a plurality of nail apertures 16 which are substantially in the quarter section 30 of the shoe 10 and substantially equally spaced therein. Preferably each branch 34 has four apertures 16; the first aperture being placed at about the point where the toe section 28 meets the quarter section 30; the next aperture 16 being placed about one-third of the way down the quarter section 30 towards the heel section 32; the third being placed about two-thirds the way down the quarter; and the fourth being placed at about the point where the quarter section 30 meets the heel section 32. The "toe section 28" as used herein, refers to the part of the shoe extending above a tangent 40, as shown in FIG. 1, drawn from the center of the shoe on a point on the inside edge of the center of the shoe. The "quarter section 30" as referred to herein refers to the portion on each branch of the shoe extending down from the toe section 28 to the widest part of the shoe. That is, as can be seen in FIG. 1, this section extends down below the tangent 40 to about where the quarter tangent 42 meets the outside edge of the shoe. The quarter tangent 42 being 90 degrees to the toe tangent 40. The "heel section 32" as used herein refers to the portion on each branch which extends from the quarter 30 to the end of the shoe.

Of course the horseshoe of the invention can include a ground facing side 12 having fullering or swedging 14.

The horseshoes of this invention are particularly suited for sport horses. "Sport horses" as used herein refers to horses used for hunting, showing, eventing, dressage and driving without regard to breed.

TABLE 1

| FIGURE REFERENCE NUMERAL | DESCRIPTION |
| --- | --- |
| 10 | horseshoe |
| 12 | ground facing side of the horseshoe |
| 14 | fullering groove |
| 16 | nail apertures |
| 18 | sole side of the horseshoe |
| 20 | arcuate depression |
| 22 | outside wall of the nail aperture |
| 24 | inside wall of the nail aperture |
| 26 | web |
| 28 | toe |
| 30 | quarter |
| 32 | heel |
| 34 | branch |
| 36 | height of the inside edge |
| 38 | height of the outside edge |
| 40 | tangent |
| 42 | quarter tangent |

EXAMPLE

A horseshoe of this invention was crafted from twelve inches of 5/16 inch by ¼ inch hot rolled bar stock. FIGS. 1–4. The fuller (or swedge) was machined in the ground surface in two steps. The first step was to give a depth and width at the bottom and the second was to give pitch, 24 degrees, on the outside edge of the fuller.

The depression was also machined in using a specially shaped end mill. This was done on the hoof surface or solar surface of the specimen shoe. In normal production, it is expected this shoe would be produce by one of several methods of forging most likely using predrawn section of bar stock. The specimen of this example was produced using a combination of forging and machine shop practices to yield a highly accurate specimen.

Eight nail holes were forged in to this shoe using a two step process to give good nail fit and pitch, 24 degrees. Step one was to forepunch each nail hole in the appropriate location as shown in FIGS. 1 and 2. Step two was to pritchel out remaining slug. Due to the unique design of the fuller combined with a prepunched hole, this allows the farrier optimal nailing which is essential in proper shoeing.

This section of stock produced an exceptionally light and strong shoe. The shoe of this example is as light as an equivalent shoe that is 1/16 of an inch thinner. Among other favorable characteristics, the shoe of the invention has the tendency to resist bending or spring which is a common problem with similar shoes.

The outside height of the finished shoe measured approximately 5/16" and the inside height of the shoe measured approximately 2/13", i.e., about 49% of the outside height.

I claim:

1. A horseshoe for attachment to a horse's hoof wall comprising:
   (a) a generally U-shaped article made of substantially solid material and having a toe section and a pair of arcuate branches with, a pair of quarter sections and heel sections at the ends thereof, said article having an inside height and an outside height, a hoof wall facing side, a ground facing, substantially planar side and a plurality of nail aperture therein for attaching said article to said hoof wall;
   (b) said top wall facing side having a depression substantially along the entire inside of the shoe extending from and including the heel section to the opposite heel section and extending inwardly to about half the width of the web;
   (c) said inside height of the shoe being within the range of about 20 to about 80 percent of the outside height of the shoe.

2. The horseshoe according to claim 1 wherein said depression extends inwardly to about half the width of the web in a manner substantially parallel to the ground facing side and terminating in an upwardly arcing manner.

3. The horseshoe according to claim 1 wherein said inside height is about 50 percent the height of the outside edge of the shoe.

4. The horseshoe according to claim 1 wherein said horseshoe is formed from one piece of material.

5. The horseshoe according to claim 1 wherein said material is steel.

6. The horseshoe according to claim 1 wherein said nail apertures define an outside edge extending downwardly through the horseshoe at an angle in the range from about 80 degrees to about 70 degrees.

7. The horseshoe according to claim 1 wherein said nail apertures define an outside edge extending downwardly through the horseshoe at an angle of about 75 degrees.

8. The horseshoe according to claim 1 further comprising four nail apertures in each branch of the horseshoe, said apertures being substantially equally spaced therein, said nail apertures defining an outside edge extending downwardly through the horseshoe at an angle in the range from about 80 degrees to about 70 degrees; the first nail aperture in the branch being placed at about the point where the toe section meets the quarter section; a section nail aperture in the branch being placed about one-third of the way down the quarter section towards the heel section; a third nail aperture in the branch being placed about two-thirds the way down the quarter section; and a fourth nail aperture being placed at about the point where the quarter section meets the heel section of the horseshoe, whereby said nail apertures are placed substantially as shown in FIG. 1.

9. The horseshoe according to claim 1 wherein the around facing side includes fullering or swedging.

10. The horseshoe according to claim 1 wherein said horseshoe is for use on a sport horse.

11. The horseshoe of claim 1 wherein said plurality of nail apertures are placed substantially in the center of the web.

* * * * *